April 24, 1945.  W. H. ADAMS, JR  2,374,574
PIPE FLANGE
Filed Oct. 5, 1943
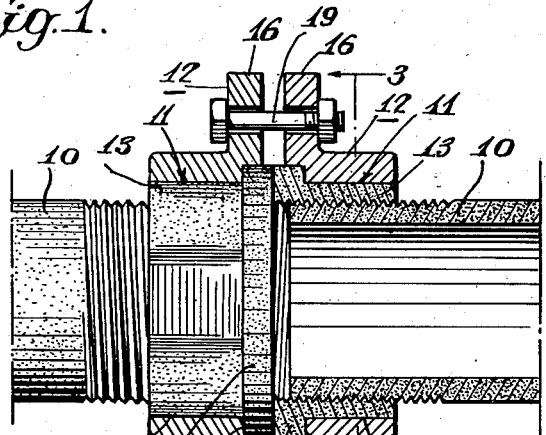
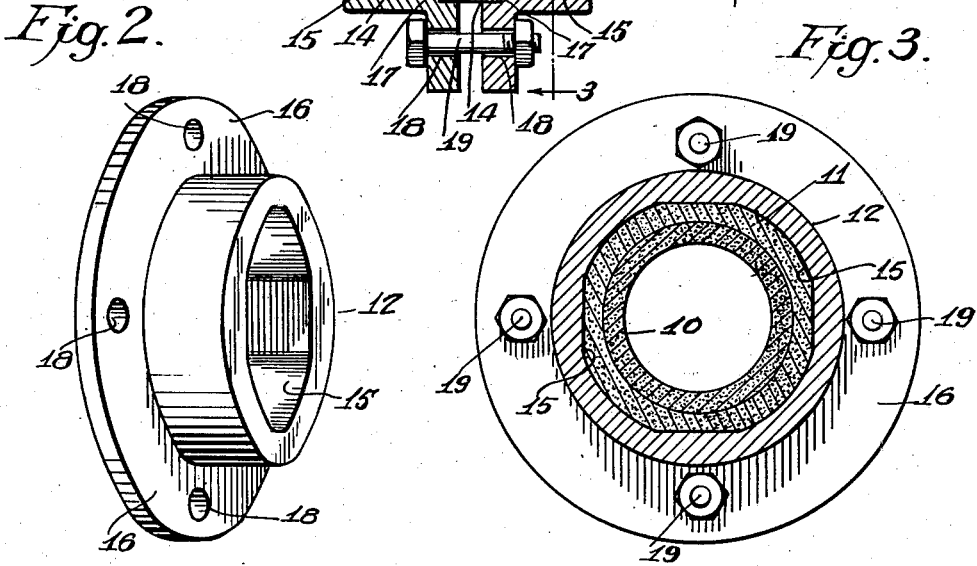
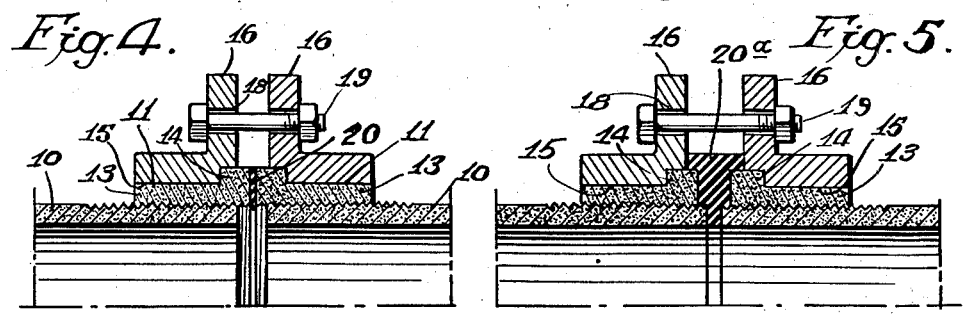
Inventor:—
William H. Adams Jr.
by his Attorneys
Howson & Howson Patented Apr. 24, 1945

2,374,574

UNITED STATES PATENT OFFICE 2,374,574

PIPE FLANGE

William H. Adams, Jr., Newark, Del., assignor to Haveg Corporation, Newark, Del., a corporation of Delaware Application October 5, 1943, Serial No. 505,069

4 Claims. (Cl. 285—138)

This invention relates to pipe couplings and more particularly to a coupling for use in conjunction with composition pipes such as those formed by molding or extrusion from artificial resins or similar synthetic compounds utilized alone or in conjunction with fibrous fillers or with material such as fabric or paper.

Conduits of this type are commonly employed in the transmission of chemicals or chemical compounds and accordingly require a union composed of materials inert to the conducted material. Production of couplings for such conduits from materials having the same characteristics as the conduit is comparatively simple where the conduit is small, but with an increase in the size of the conduit the problem of producing the coupling and more particularly the connecting means between confronting elements of the coupling becomes, for various reasons, impractical. Principal among these reasons is the fact that production of the necessary coupling flange upon a composition coupling element becomes commercially impractical and an important object of the present invention is that of providing a relatively large size coupling wherein the chemically inert element of the coupling may have a coupling flange of such size that practical production thereof is feasible.

Another feature introducing difficulty into the production of couplings for relatively large size conduits of this character lies in the fact that with an increase in the size of the conduit the problem of properly setting a threaded coupling member upon the conduit requires a constantly increasing force. Due to this fact, application of couplings to relatively large pipes necessitate the provision of special tools, since the mechanic employing ordinary tools and basing his knowledge of the ordinary application of metallic couplings to their conduits, will, in many instances, damage the coupling element to an extent rendering it unusable.

A further object of the invention is the provision of a pipe engaging coupling element having a backing which will permit utilization, in conduit couplings of relatively large size, of a flange or "pull-up" formation of a diameter not exceeding that ordinarily employed of the smaller sizes of conduits now in common use and which embodies a backing up element serving not only to reenforce the "pull-up" element of the inner coupling member, but likewise as a wrench so constructed that adequate torque may be applied to the inner member to assure its proper seating upon the conduit without possibility of any damage thereto.

These and other objects I attain by the construction shown in the accompanying drawing wherein for the purpose of illustration I have shown a preferred embodiment of my invention and wherein:

Figure 1 is a view partially in longitudinal section of a coupling constructed in accordance with my invention.

Figure 2 is a perspective view of one of the outer metallic elements of the coupling.

Figure 3 is a section on line 3—3 of Figure 1 and

Figures 4 and 5 are fragmentary sectional views illustrating optional methods of completing the seal at the coupling.

Referring now more particularly to the drawing, the numeral 10 generally designates adjacent sections of a conduit which are to be connected and 11 and 12 inner and outer conduit sections employed in connecting the same. The inner connecting sections each comprise an interiorly threaded hub 13 adapted to engage the conduit 10, said hub having at the inner end thereof a flange or enlargement indicated at 14. The exterior of the hub 11 is noncircular in form, as more clearly seen in Figure 3 and the outer coupling element 12 has a bore 15 conforming in shape and size to the exterior of the hub 13 and is formed at one end with a flange 16 preferably counterbored as at 17 to receive the flange 14. The flange 16 thus at least partially houses the flange 14 and serves to prevent breakage thereof under the pressures exerted when the seal is completed by direct pressure engagement between the flanges 14. Flange 16 is furthermore adapted as at 18 for the reception of the connecting elements 19, by means of which opposing coupling units comprising the inner and outer elements 11 and 12 may be drawn into sealing engagement with one another. It will be obvious that the outer coupling elements 12 may be utilized as wrenches in seating the inner elements 11 on the conduit and that this may be accomplished without damage to the inner elements.

As shown, the surface of the flange 14 of the inner element preferably projects slightly beyond the corresponding face of the flange 16 of the outer element with the result that the flanges 14 of opposed inner elements may be drawn into sealing engagement with one another. Where, as is preferred, said inner coupling elements are composed of a composition such as "Haveg" (described in "The Chemistry of Synthetic Resins" by Carleton Ellis, copyright 1935, page 458), or of a thermoplastic composition, such as a copolymer of vinyl chloride with vinylidene chloride ("Saran"), adjacent faces of the flanges 14 may be brought into direct sealing engagement with one another. The actual seal may, however, be effected by inserting between adjacent faces of the flanges 14, a gasket 20 of material inert to the material being conducted as shown in Figure 4 or in such instances where the adjacent ends of the conduits 10 are most nearly opposed a similar gasket 20a may be interposed between such ends as suggested in Figure 5.

Since the specific construction herein illustrated is obviously capable of considerable modification without departing from the spirit of my invention, I accordingly do not wish to be understood as limiting myself thereto except as hereinafter claimed.

I claim:

1. A coupling for connecting the confronting ends of formed non-metallic conduit sections comprising a pair of inner conduit engaging elements of material having substantially the same characteristics as the conduit sections and threaded thereon, adjacent ends of said elements each having an annular flange, and outer metallic members snugly surrounding said inner elements and each having at one end a flange provided with a recess to partially house the flange of the inner elements, the flanges of said members being adapted for engagement by connectors whereby the flanges of the elements may be brought into sealing engagement with one another, said elements being non-circular in cross section.

2. A tube coupling comprising an inner tube engaging member having a non-circular exterior profile and having a flange at one end thereof and an outer member having a bore fitting the inner member and having at one end a backing means for the flange of the inner member, and means for coupling two such outer members together to thereby bring the flanged ends of the inner members into cooperating engagement at a seal.

3. A tube coupling comprising a molded non-metallic inner tube engaging member having a non-circular exterior profile and having a flange at one end thereof and an outer metallic member having a bore fitting the inner member and having at one end a backing means for the flange of the inner member, and means for coupling two such outer members together to thereby bring the flanged ends of the inner members into cooperating engagement at a seal.

4. A tube coupling comprising a molded non-metallic inner tube engaging member having a non-circular exterior profile and having a flange at one end thereof and an outer metallic member having a bore fitting the inner member and having at one end a backing means for the flange of the inner member, and means for coupling two such outer members together to thereby bring the flanged ends of the inner members into cooperating engagement at a seal, the backing means for the flange being counterbored to partially house the flange.

WILLIAM H. ADAMS, JR.